United States Patent [19] [11] 4,049,182
Louw et al. [45] Sept. 20, 1977

[54] INERTIA WELDING INDEXING SYSTEM

[75] Inventors: Johan August Louw, Orange; Robert Earle Ghiselin, Costa Mesa, both of Calif.

[73] Assignee: Textron Inc., Santa Ana, Calif.

[21] Appl. No.: 443,233

[22] Filed: Feb. 19, 1974

[51] Int. Cl.² .......................................... B23K 19/02
[52] U.S. Cl. ..................................... 228/2; 228/6 R; 228/49; 228/113
[58] Field of Search ................ 228/2, 4, 49, 112, 113, 228/4.1, 6; 29/470.3; 156/73, 580

[56] References Cited

U.S. PATENT DOCUMENTS

| | | | |
|---|---|---|---|
| 3,297,504 | 1/1967 | Brown et al. | 156/73 |
| 3,501,079 | 3/1970 | Martin et al. | 228/2 |
| 3,613,982 | 10/1971 | Hollenberg et al. | 228/2 |
| 3,708,376 | 1/1973 | Mistarz et al. | 156/73 |

Primary Examiner—Francis S. Husar
Assistant Examiner—Gus T. Hampilos
Attorney, Agent, or Firm—Harvey C. Nienow

[57] ABSTRACT

Friction welding apparatus for substantially automatically welding relatively small diameter workpieces.

The apparatus comprises a pair of spaced segmented transfer wheels on a single shaft for retaining workpieces and rotating the same between loading, welding and ejection stations, and a plurality of high-speed motors which carry workpieces at the opposite ends of each rotor, such motors being moveable from a load station through a series of speed-increasing stations to a weld station between the several transfer wheels. Hydraulic means then forces the oppositely disposed transfer wheel segments in their weld stations toward the motor therebetween to simultaneously complete two friction welds. Thereafter, the parts are ejected when the wheel segments move to the ejection stations.

9 Claims, 9 Drawing Figures

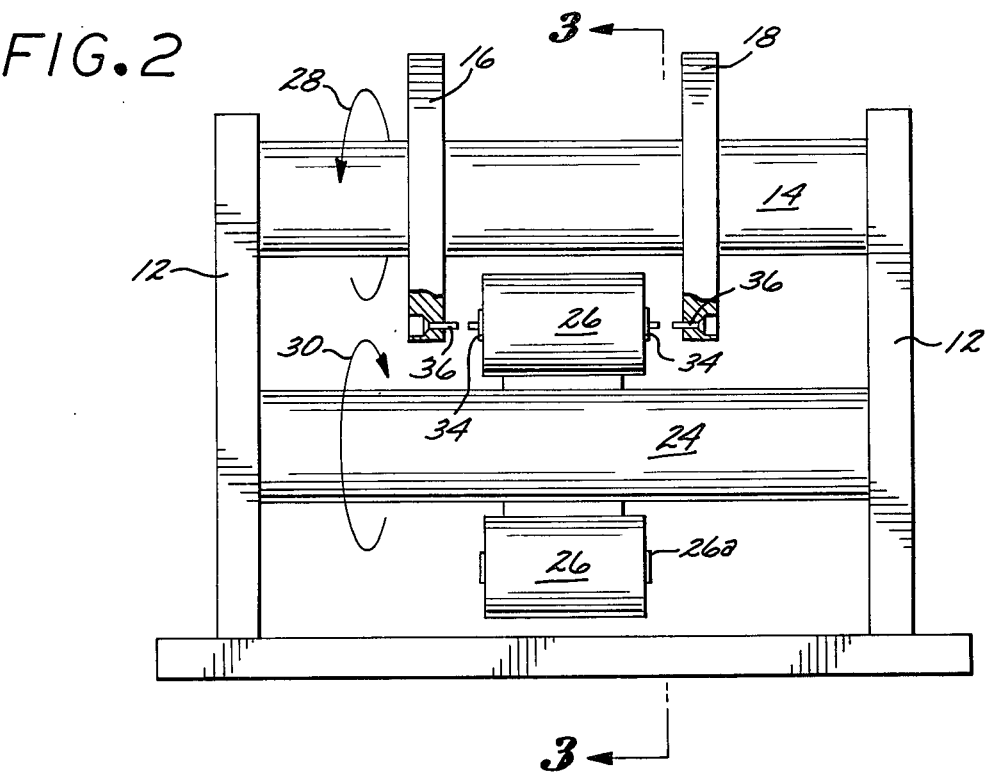
FIG. 2
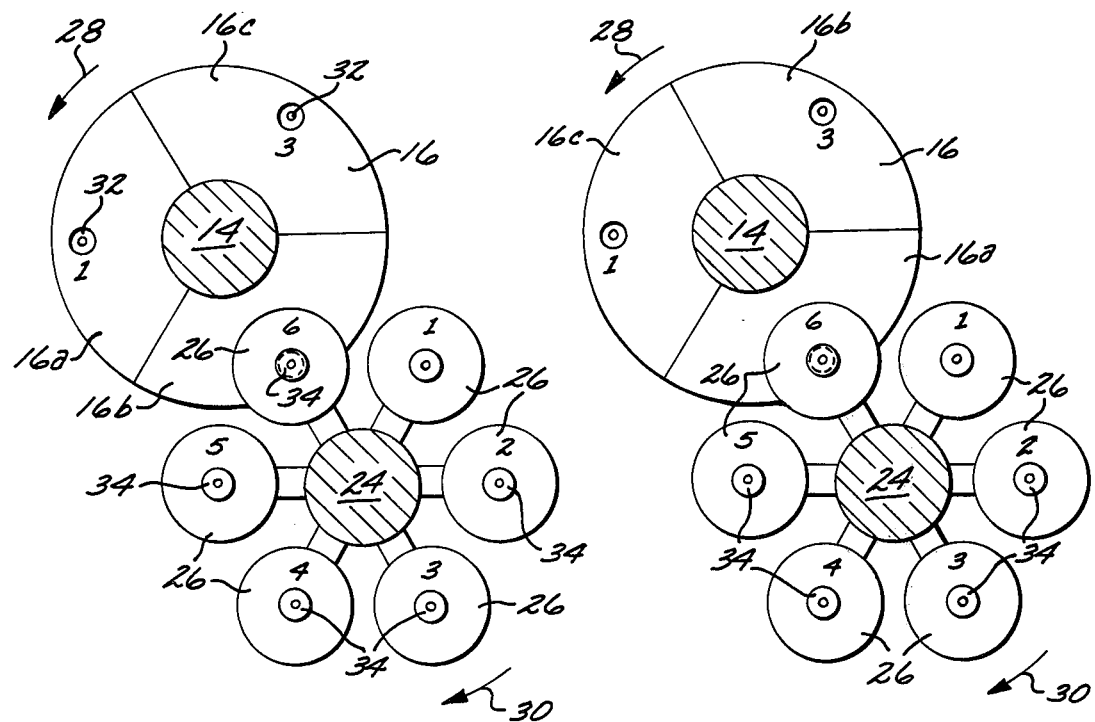
FIG. 3
FIG. 4

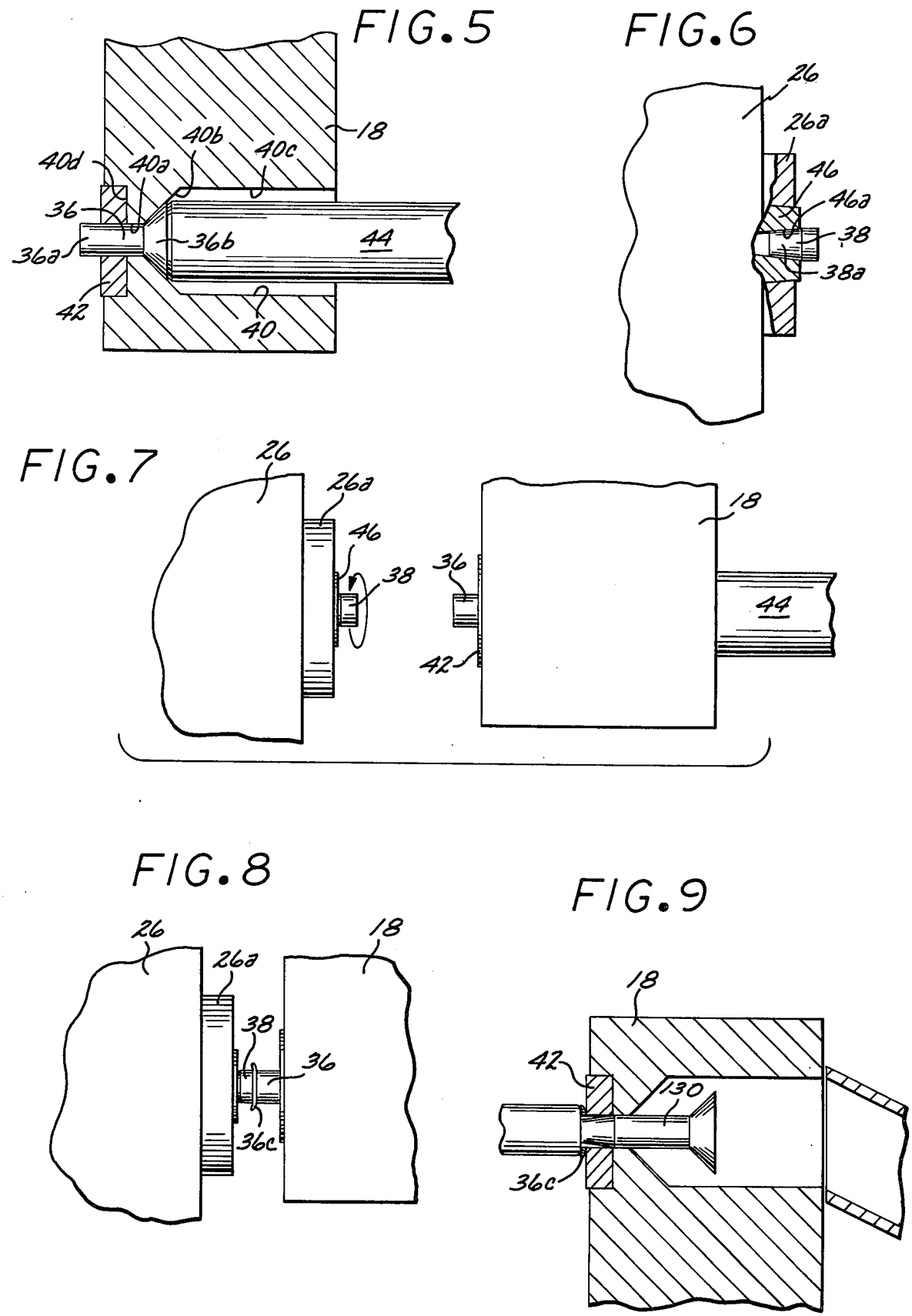

INERTIA WELDING INDEXING SYSTEM

The present invention relates generally to friction welding apparatus, and more particularly to such apparatus as used for substantially automatically welding relatively small diameter parts or workpieces.

The broad concept of welding together several parts by forcefully engaging them while one part is stationary and the other is rotating at a predetermined speed, is not new at this time. Rather, various uses have been made of such general concept to create an extremely efficient and effective weld between workpieces of the same or different materials.

This type of welding permits the precise amount of heat to be applied at the weld interface since the relative rotation of the parts as well as the mass and hence inertia of the rotating parts can be calculated very accurately. Thus, the repeatability of the welding process so as to make a great many weldments of the same strength and quality is possible.

Heretofore, however, such welding process has been used almost exclusively for welding together relatively large, massive parts. As such, the apparatus heretofore available for making friction welds has been fairly large and cumbersome.

In order to weld together extremely small diameter parts or pieces, entirely different apparatus and other equipment has been contemplated, and automatic features become even more important due to the need for low-cost mass production techniques in making relatively sophisticated welds in small and basically inexpensive articles.

One type of friction welding which has been used in the past is inertia welding. In this process, the rotating workpiece is brought up to speed and thereafter the driving energy is disconnected from the rotating workpiece and its associated mechanical means for retaining the same on a given axis of rotation. The rotational inertia thereby stored in the rotating parts constitutes the sole energy source for making the weld and, if properly pre-calculated, the entire inertial energy is expended in the weld, and the rotating parts including the welded workpieces are brought to rest upon the completion of the weld.

For some time it has been a desire to provide automatic equipment which will permit relatively small parts or workpieces to be welded together in relatively automatic mass production fashion. Accordingly, it is an object of the present invention to provide friction welding apparatus whereby parts can be loaded at one station of the apparatus and thereafter finished welded parts ejected from the apparatus, without the intervention of manual labor of any kind.

Another object of the present invention is to provide friction welding apparatus as characterized above wherein both the stationary and rotatable parts are manually inserted in the apparatus and thereafter proceed through appropriate stations to effect the proper friction weld.

A further object of the present invention is to provide friction welding apparatus as characterized above wherein motors capable of attaining rotational speeds on the order of one hundred thousand rpm are employed.

Another object of the present invention is to provide friction welding apparatus as characterized above wherein the high-speed motors, after being loaded, are brought through a series of speed-increasing stations prior to the friction welding operation.

An even further object of the present invention is to provide friction welding apparatus as characterized above wherein the non-rotatable workpieces are moved relative to the motor during the weld operation to cause the non-rotatable workpieces to engage the rotatable workpieces.

Another further object of the present invention is to provide friction welding apparatus as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 2 is a sectional schematic view showing the relationship between the various parts;

FIG. 3 is a diagramatic view showing the various positions or stations;

FIG. 4 is a diagramatic view similar to FIG. 3;

FIG. 5 is a fragmentary sectional view showing holding means for a stationary workpiece;

FIG. 6 is a fragmentary sectional view showing holding means for a rotatable workpiece;

FIG. 7 is a fragmentary elevational view showing several workpieces in their weld stations;

FIG. 8 is a fragmentary elevational view showing the several workpieces together; and FIG. 9 shows ejection of the finished part at the ejection station of the subject apparatus.

Like reference characters indicate corresponding parts throughout the several views of the drawings.

Figure 1:
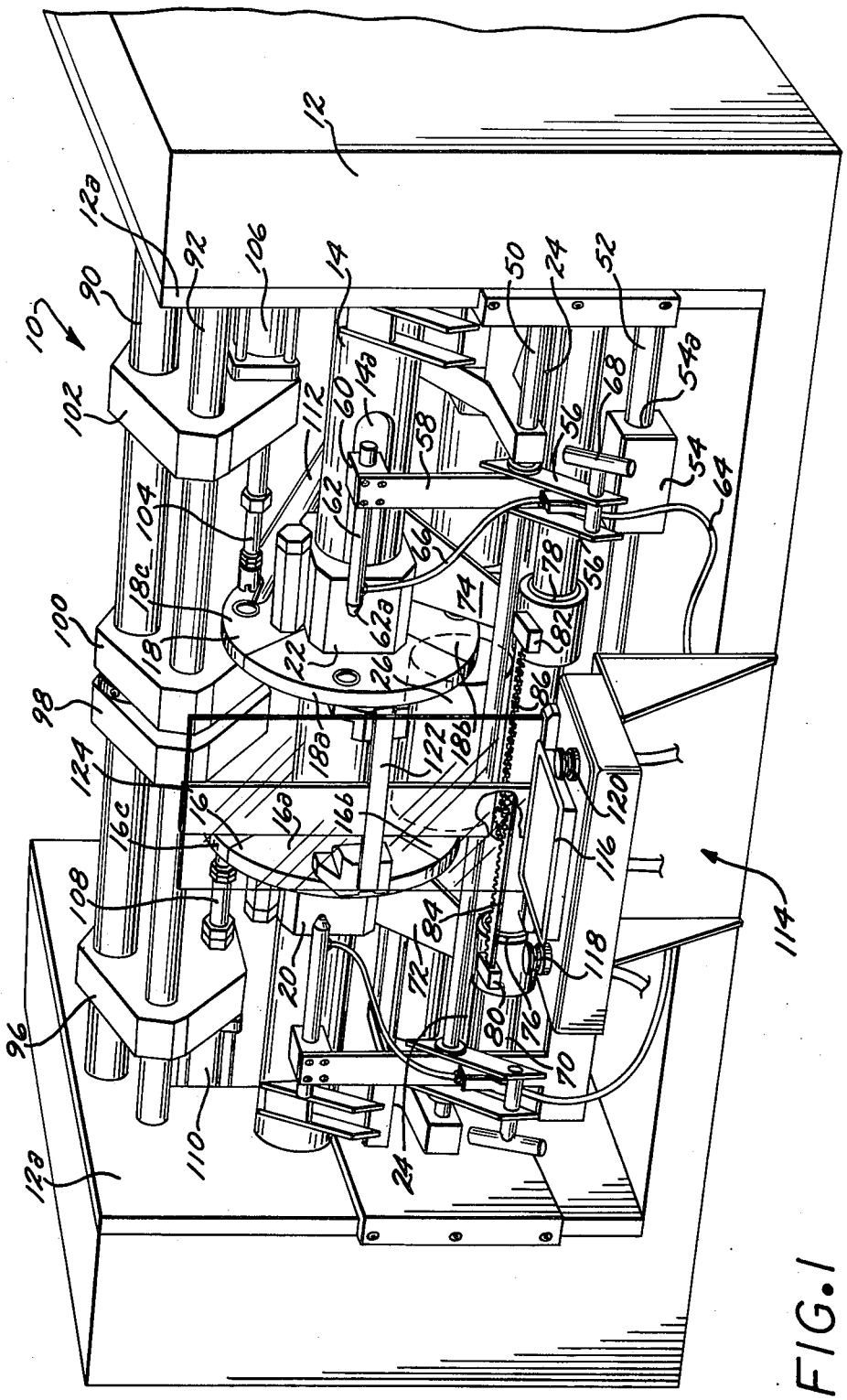
FIG. 1 is a perspective view of friction welding apparatus according to the present invention.

Referring to FIG. 1 of the drawings there is shown therein apparatus 10 according to the present invention. It comprises a generally U shaped frame 12 having oppositely disposed supporting plates 12a wherein a plurality of shafts are secured as will hereinafter become more apparent.

One of the primary rotatable shafts is shaft 14 which extends between the several support plates 12a and carries a pair of spaced transfer wheels 16 and 18 which are permitted axial movement on shaft 14 as will hereinafter become more apparent. In this regard, each of the transfer wheels 16 and 18 is slidably mounted on a collar, as shown respectively at 20 and 22, each of such collars being adjustably positioned on shaft 14 by means of a cutout 14a having threaded fastening holes therein. Although not shown in detail in the drawings, each wheel is divided into segments, and each segment is provided with extensions which slide within appropriate holes in the respective collars 20 and 22. Thus, each segment, for reasons which will hereinafter be more readily apparent, is free to move axially on shaft 14 independently of every other segment.

Appropriate control means (not shown in the drawings), is connected to shaft 14 to provide it with three distinct angular positions so as to provide three distinct work stations for the several transfer wheels. Since both wheels are fastened to the same shaft 14, they progress in unison from one station to another.

As shown diagramatically in FIGS. 2, 3 and 4 of the drawings, and as partially seen in FIG. 1 of the drawings, the present invention further comprises a shaft 24 wherein are carried six separate and distinct electric motors 26. As shown most clearly in FIGS. 3 and 4, each such motor 26 is radially offset from the axis of rotation of shaft 24, and the six motors are equiangularly spaced thereabout.

As will hereinafter be more fully explained, the shaft 24 is provided with six separate and distinct angular positions providing six separate work stations, one loading station, four speed-increasing stations and one weld station. The motor 26 shown in FIG. 1 is in the weld position as will hereinafter be more fully explained.

As shown in FIG. 2 of the drawings, the physical relationship between the various motors 26 and the transfer wheels 16 and 18, is that as the motors 26 rotate with shaft 24, they do so between the planes of rotation of the wheels 16 and 18. Ultimately, as each motor 26 reaches the weld station, it is interposed between the wheels as shown diagramatically in FIG. 2.

FIG. 2 corresponds to the view afforded by FIG. 1, in that the transfer wheel shaft 14 is closer to the viewer than is the motor shaft 24. This arrangement enables an operator to load the transfer wheels from the front of the machine 10 as viewed in FIG. 1, while the motors 26 are loaded from the opposite side of the machie by an operator located thereat.

As shown by arrows 28 and 30, in FIGS. 2, 3 and 4, shaft 14 will transfer wheels 16 and 18 thereon rotates in one direction while the shaft 24 with motors 26 thereon rotates in the opposite direction.

Each segment of the transfer wheels 16 and 18 is provided with a workpiece retainer 32 for retaining a workpiece to be friction welded to another workpiece. Such other workpieces are held in the various electric motors, each of the latter being provided with a rotor 26a whose opposite ends are provided with workpiece holders 34. Such retainers and holders will be hereinafter described in greater detail.

Referring to FIG. 3 of the drawings, it is seen that segment 16a of transfer wheel 16 is at station number 1, namely the loading station for the several transfer wheels. This station is also shown as the position of segment 16a in FIG. 1. At the same time, segment 16b is at station number 2, the weld station and station number 3, occupied by segment 16c, is the ejection station wherein the finished part is removed automatically as will hereinafter be explained.

Coordinated with the movement of the transfer wheels between their several stations, is the movement of the motors from one to another of their various stations. As indicated in FIG. 3 of the drawings, station number 1 for motor 26 is the loading sttion wherein parts are placed in the workpiece holders at opposite ends of the rotor as will hereinafter be explained. Upon occurrence of the next cycle, shaft 24 rotates causing the motors to successively move to the next station, stations 2-5 inclusive being speed-increasing stations and station 6 being the weld station.

It is necessary to increase the speed of rotation of the rotor 34 of each motor because the relatively small diameter parts require speeds on the order of 100,000 rpm in order to provide the necessary inertia to perform the desired weld. That is, in order to create the necessary amount of heat to make a good, strong weld, what with the workpieces having extemely small mean radii due to their small diameter, the parts must be rotated at high speed. Thus, the motor stations 2 through 5 are employed to successively increase the speed from 0 rmp at loading station 1 to the desired speed at weld station 6.

Rotation of shafts 14 and 24 is coordinated and controlled by appropriate control means (not shown in the drawings) although initiation of each cycle or step is effected by the several operators as will hereinafter be explained. In addition, suitable control means is employed for insuring that the rotor of each motor 26 at the weld station has attained the proper speed before the weld operation takes place. To this end, there is speed-sensing means employed for preventing the weld operation from taking place unless the speed of the rotor at the weld station is within certain prescribed limits.

Although it is contemplated within the scope of the instant invention that workpiece retaining means of substantially any form may be used in the various segments of the transfer wheels 16 and 18, certain specific retaining means are shown on the drawings. It is also contemplated that although the instant invention is particularly well adapted for use in welding several workpieces or parts of a fastener such as a rivet or bolt, it could be employed for welding together substantially any kind or type of parts. Thus, the particular workpiece retaining means provided in the wheel segments could be particularized for the kinds or types of workpieces to be retained therein.

Shown in the drawings, most particularly FIG. 5, is means for retaining the head and portion 36 of a rivet to be formed, the opposite end 38 of such rivet being shown in FIG. 6.

Each segment of each of the transfer wheels as illustrated in the drawings, is formed with a through opening 40 having a reduced central portion 40a for snuggly accommodating the shank of rivet portion 36, a tapered portion 40b and an enlarged cylindrical portion 40c. Further, such opening 40 is formed with an end recess or counterbore 40d for receiving a shearing die 42 whose function will be hereinafter described. The head end portion 36 is inserted into the opening 40 such that the end 36a thereof extends beyond the shear die 42 while the tapered portion of the head 36b engages the tapered portion 40b of the workpiece retainer. To retain the head end portion 36 in such loaded position, while at the weld station, there is provided a hydraulically operated plunger 44 whose function will be hereinafter explained in greater detail.

Thus, the head end portions 36 of each rivet to be formed is positioned in the respective wheel segments such that the end portions 36a face inwardly or toward the plane of rotation of the motors 26.

For holding the tail portion 38 of each rivet to be formed there is a tapered chuck 46 in each end of each rotor 26a of each motor 26. Since the end 38a of each tail portion 38 is tapered, in order to have holding means firmly grip the same to prevent rotation thereof during the weld operation, the tapered opening 46a is made to correspond thereto in both size and shape.

Referring to FIG. 1 of the drawings, there is shown therein, apparatus for quickly and effectively loading the transfer wheels 16 and 18. To this end, a pair of shafts 50 and 52 are provided between the support plates 12a. A mounting block 54 having a through opening 54a is slidably mounted on shaft 52 and carried mounting plates 56 each of which is provided with a through opening which slidably fits on shaft 50. An upstanding support bracket 58 is positioned between and fastened to the plates 56 and carries a mounting block 60 at its upper end. Said block is provided with a through opening wherein a vacuum probe 62 is rigidly positioned, such probe having a tapered end portion 62a. Suitable vacuum lines 64 and 66 provide a vacuum to probe 62, the latter of which is provided with a centrally located through opening in the tip 62a so that a vacuum is afforded at the very end of tapered tip 62a. Handle 68 is connected relative to the plates 56 whereby the operator can manually position the probe on the shafts 50 and 52 as will hereinafter become more apparent.

It should be understood that the loading mechanisms for the several transfer wheels are identical in construction, although a mirror image of each other, since the entire apparatus is symmetrical about a plain perpendicular to shaft 14 and midway between the transfer plates 16 and 18.

Also connected between the several supports plates 12a of the U-shaped mounting frame 12 are several additional shafts one of which is shown at 70. The other such shaft is not visible in FIG. 1 of the drawing. A pair of force transmitting members 72 and 74 are each formed with enlarged opposite end portions for receiving and retaining suitable bushings or bearings as shown at 76 and 78 for enabling the force-transmitting members to individually and reciprocatably move on the shaft 70. In like fashion, the opposite ends of such members 72 and 74 are individually formed with enlargements having bushings or bearings therein for reciprocatable movement on the shaft which is not viewable in FIG. 1. This arrangement enables the several force-transmitting members 72 and 74 to have reciprocatable movement of such shafts, toward and away from the respective transfer wheels 16 and 18.

Carried by such force transmitting members are the aforementioned plungers 44 as shown in FIG. 5 of the drawings. Such plungers engage the workpieces 36 in the retainers of the particular segment of the wheels which are in the weld station.

Suitable hydraulic operating means is employed for actuating the members 72 and 74 towards their respective transfer wheels 16 and 18. Such hydraulic means is not shown in the drawings but operate between the U-shaped frame 12 and the respective members 72 and 74 to forcibly move the same toward the wheels.

To assist in moving such members simultaneously toward the respective wheels so that the forces are applied at the same time, there may be provided on each of the members 72 and 74 a mounting bracket 80 and 82, respectively, for retaining a gear rack, 84 and 86 respectively. Such gear racks extend in opposite directions with the gear teeth thereof in opposed spaced relation. A pinion gear (not shown) is positioned between the oppositely disposed rach gears and simultaneously engages them to insure that one rack gear will not move without the other moving equally but in the opposite direction. That is, as one rack gear is driven with the corresponding member 72 or 74, the pinion gears turns accordingly, thus moving the other rack gear the same distance but in the opposite direction. This may be used to assist in assuring simultaneous or near simultaneous welding operation at the opposite ends of the rotor, as will hereinafter become more apparent.

Referring to FIG. 1 of the drawings, the positions of wheel segments 16c and 18c depict the ejection stations for the finished, welded products. In this regard, a pair of shafts 90 and 92 are provided between the mounting plates 12a of the U-shaped frame 12. Mounted on such shafts are abutment members 96, 98, 100 and 102. Each pair of abutments, for instance, members 96 and 98, comprise a horizontal punch press as will hereinafter become more apparent.

Plunger 104 operated by a hydraulic mechanism 106 is provided to be moved toward the transfer wheel 18 toward the workpiece in the retainer at the ejection station. On the opposite side of wheel 18, namely between wheel 18 and abutment 100, is an ejection pin firmly secured to abutment 100.

In like fashion, there is provided abutment 96 and wheel 16, a plunger 108 which is hydraulically operated by mechanism 110. Also, there is an ejection pin (not shown) on abutment 98 extending toward transfer wheel 16.

A trough or tube 112 is provided adjacent each of the transfer wheels to receive the finished product or parts as will hereinafter appear, and to transport the same to a hopper or bin.

Positioned on opposite sides of the entire unit 10 shown in FIG. 1 are operators' stations, only one of which is shown in FIG. 1 at 114. Station 14 comprises a tray 116 containing pieces 36 to be inserted in the several transfer wheels 16 and 18, as well as a pair of protective switches 118 and 120.

The operator's station on the opposite side of apparatus 10 comprises a similar tray, but having workpieces 38 to be inserted into the above described work holders for the rotors of the motors 26. also, at the operator's station which is not shown in FIG. 1 there are similar safety switches for the protection of the operators against injury and the like.

The subject friction welding apparatus 10 is operated generally as follows: As above explained, one operator stands at the station 114, and another operator stands at the station (not shown) on the opposite side of the apparatus.

The tray 116 is filled with workpieces 36 which are to be individually friction welded to one of the workpieces 38.

With the apparatus positioned as shown in FIG. 1, the operator at Station 114 takes two workpieces 36 (one in each hand) and inserts the same in the probe tips 62 of the several vacuum probes 62a. The vacuum provided through conduits 64 and 66 enables air pressure to hold such workpieces 36 in place with their ends 36a facing the respective workpiece retainers in the segments of the transfer wheels 16 and 18 then in their loading stations.

Thereafter, the operator grasps the handles 68 and pulls them toward the center of the machine on shafts 50 and 52 causing the probes 62 to place the workpieces 36 in the appropriate workpiece holders. Since the segments of the several transfer wheels are reciprocatably mounted on shaft 14, appropriate abutment or backup means in the form of a horizontal bar 122 is provided adjacent the several wheel segments in their loading stations. Such bar 122 is attached to a support 124 which, in turn, is fastened to the base of the machine to hold bar 122 in its proper position.

Thus, as the several probes 62 are moved toward the center of the machine, the loading segments of the transfer wheels are provided with a workpiece 36, the bar 122 providing a backstop for such loading thrust. Thereafter, the operator at station 114 depresses the several safety switches 118 and 120.

At the same time, the operator on the other side of apparatus 10 takes several of the workpieces 38 (one in each hand) and places them in the workpiece holders in the opposite ends of the motor 26 then in the load position as above explained and as shown in FIGS. 3 and 4. After this has been done, the operator at that station closes the several safety switches and the apparatus 10 is energized through all four safety switches.

The loaded segments of wheels 16 and 18 in the position of segments 16a and 18a rotate to the weld positions shown at 16b and 18b. At the same time, a motor 26 moves to the corresponding weld position, the workpieces therein rotating at the proper speed to effectuate the proper inertia weld as above described.

Then, with a motor 26 and the appropriate segments of the transfer wheels in the weld position, the members 72 and 74 are moved toward the center of machine 10. The probes 44, as shown in FIG. 5, engage the head 36b of each of the workpieces except for 36 in wheel segments to retain them in the corresponding workpiece holders.

The motor at the weld station remains stationary except for rotation of the rotor thereof and the several workpieces 38 therein and ultimately further movement of the members 72 and 74 toward the center of the machine causes the workpieces 36 to engage the corresponding workpiece 38.

However, before such engagement takes place, the source of energy for the motor 26 at the weld station is disconnected so as to permit the rotor and workpieces 38 to have a predetermined amount of kinetic energy. This, as above explained, is the total amount of energy which is used to effectuate the desired weld.

In order to hold the workpieces 36 in their respective retainers, and before the weld takes place, the probes 44 engage the respective workpieces 36 to hold them firmly in place. Further movement of the probes moves the entire transfer wheel segment toward the motor.

As above explained, the several racks 84 and 86 operating on the pinion gear may be used to insure that welding engagement takes place simultaneously at the opposite ends of the motor.

When the welds are completed, the rotor is at rest and the operators have loaded the next segment of the transfer wheels 16 and 18 as the rotor of the motor then in the load position as above described.

The members 72 and 74 then automatically retract and the wheel segments in the weld position move away from the motor 26 taking with them the welded product or part.

The motor is then free to move to the load position described above but will not do so, of course, until the four safety switches are closed as above explained. The shaft 24 on which the various high speed motors are mounted, has 6 discreet stations or positions enabling the rotor to be brought up to the proper speed automatically as each motor progresses from the load station to the weld station.

The wheel segments then move to the ejection station represented by the position of segments 16c and 18c in FIG. 1, while the motors 26 advance one station.

At the ejection station, the several hydraulic operators 106 and 110 automatically operate to move their respective plungers 104 and 108 toward the appropriate wheel segments, driving them back toward the ejection pins on the several members 98 and 100 respectively.

When this happens, as shown clearly in FIG. 9 of the drawings, each ejection pin drives the corresponding welded product through the shearing die 42, causing the flash 36c to be removed. Such flash, of course, is the result of the welding operation and extends around the part or product. Then, as the plungers 104 and 108 are automatically retracted in response to the appropriate operation of hydraulic operators 106 and 100, the finished parts or pieces 130 are dropped into the troughs 112 on either side of the apparatus 10 to be conducted by gravity to a holding bin.

The above described cycling continues to take place as long as workpieces are inserted into the segments of wheels 16 and 18 and the rotors of motors 26 when in their respective loading stations, provided the safety switches at the several operators' stations are properly and simultaneously closed. This continues repetitively with the transfer wheels moving from one to another of three operating stations and the motors moving from one to another of six operating stations per revolution.

Although we have shown and described certain specific embodiments of our invention, we are well aware that many modifications thereof are possible. Accordingly, the appended claims should be so interpreted.

We claim:

1. Friction welding apparatus comprising in combination,
    a transfer wheel having three workpiece retainers and being rotatable about a first axis to move said retainers sequentially from a load station to a weld station to an ejection station and back to the load station,
    at least three motors each of which is adapted with at least on workpiece holder,
    mounting means for said motors to rotate the same about a second axis sequentially from a load station to at least one speed station to a weld station and back to the load station,
    and motive power means operatively connected to said transfer wheel and to said mounting means to simultaneously move said retainers and motors from one to another of their respective stations, each of said motors being moved from its speed station to its weld station while one of said retainers is moved from its load station to its weld station, whereby each of said motors is afforded time between its load and weld stations to attain predetermined speed.

2. Friction welding apparatus according to claim 1 wherein said workpiece retainer and said workpiece holder are so positioned in said transfer wheel and mounting means, respectively, that they are in predetermined alignment with each other when at their weld stations.

3. Friction welding apparatus according to claim 2,
    wherein each of said motors comprises a rotatable rotor and the respective holder is affixed thereto to rotate the holder about an axis substantially parallel to the axis of rotation of said mounting means.

4. Friction welding apparatus according to claim 3,
    wherein said transfer wheel is formed into segments a separate one for each of said workpiece retainers, each of said segments being moveable axially and separately from the other of said segments.

5. Friction welding apparatus according to claim 1,
    wherein a pair of rotatable transfer wheels is provided and each of said motors is provided with a rotor the opposite ends of which are each provided with a workpiece holder,
    said wheels being disposed on opposite sides of said motor for juxtapositioning of each workpiece holder with a separate one of said workpiece retainers when but only when said holders and retainers are at their weld stations.

6. Friction welding apparatus according to claim 5 wherein hydraulic means is provided for moving said workpiece retainers toward the respective workpiece holders to effect friction welding of workpieces therein during operation of said motor.

7. Friction welding apparatus according to claim 6, wherein the rotor in each of said motors is axially moveable in response to end forces thereon to insure substantially simultaneous friction welding of the workpieces in said respective workpiece holders.

8. Friction welding apparatus according to claim 7, wherein each transfer wheel is formed into segments each of which has a workpiece retainer and is moveable axially and independently from the other of said segments, and said motors are mounted to sequentially rotate to a weld station between said transfer wheels, each segment having its retainer when at said weld station axially moveable toward the motor at its weld station.

9. Friction welding apparatus according to claim 8, wherein six motors are radially and equiangularly mounted on said mounting means, each of said motors sequentially and successively moving from a load station to four successive accelleration speed stations and then to its weld station.

* * * * *